(12) United States Patent
Yamamoto (10) Patent No.: US 11,999,552 B2
(45) Date of Patent: Jun. 4, 2024

(54) TRANSPORT CONTAINER

(71) Applicant: SHARP KABUSHIKI KAISHA, Sakai (JP)

(72) Inventor: Satohiko Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 288 days.

(21) Appl. No.: 17/623,826

(22) PCT Filed: Sep. 15, 2020

(86) PCT No.: PCT/JP2020/034797
§ 371 (c)(1),
(2) Date: Dec. 29, 2021

(87) PCT Pub. No.: WO2021/054296
PCT Pub. Date: Mar. 25, 2021

(65) Prior Publication Data
US 2022/0242647 A1  Aug. 4, 2022

(30) Foreign Application Priority Data

Sep. 18, 2019 (JP) ................................ 2019-169616

(51) Int. Cl.
*B65D 81/20* (2006.01)
*B65D 77/04* (2006.01)
*B65D 85/50* (2006.01)

(52) U.S. Cl.
CPC ......... *B65D 81/2069* (2013.01); *B65D 77/04* (2013.01); *B65D 85/50* (2013.01)

(58) Field of Classification Search
CPC .. B65D 81/20; B65D 81/2069; A01N 1/0263; A01N 1/0273; A01N 1/0294; A23B 4/015; A23B 7/015; A01K 63/02

USPC .................. 206/216, 524.4, 524.5, 703–705; 426/240

See application file for complete search history.

(56) References Cited

U.S. PATENT DOCUMENTS

| | | | |
|---|---|---|---|
| 8,820,532 B2* | 9/2014 | Shannon | B65D 53/00 206/204 |
| 2013/0337121 A1* | 12/2013 | Sugano | A23L 3/26 426/232 |
| 2014/0166516 A1* | 6/2014 | Martinez | A45F 5/021 206/372 |
| 2014/0262884 A1* | 9/2014 | Priebe | A61M 5/321 206/538 |
| 2016/0205957 A1* | 7/2016 | Izu | F25D 17/042 |

(Continued)

FOREIGN PATENT DOCUMENTS

| | | |
|---|---|---|
| CN | 208665854 U | 3/2019 |
| JP | 2012-134000 A | 7/2012 |
| JP | 2014-215020 A | 11/2014 |

(Continued)

OTHER PUBLICATIONS

JP2014215020A, Kato Fumiaki, Patent Translate Powered by EPO and Google, 10 pages.*

*Primary Examiner* — Luan K Bui
(74) *Attorney, Agent, or Firm* — ScienBiziP, P.C.

(57) ABSTRACT

A transport container is a transport container for transporting a biological component being a cell or a collection of cells, and includes an ion generation device configured to generate a discharge product inside the transport container by discharge.

8 Claims, 5 Drawing Sheets

(56) References Cited

U.S. PATENT DOCUMENTS

2020/0263921 A1\* 8/2020 Kawanami .............. F25D 29/00

FOREIGN PATENT DOCUMENTS

| JP | 2015-043753 A | 3/2015 |
| JP | 2019-064702 A | 4/2019 |

\* cited by examiner

| CONDITION | Dish NAME | VIABLE CELL COUNT ($\times 10^6$ cells) | AVERAGE VIABLE CELL COUNT ± STANDARD DEVIATION ($\times 10^6$ cells) | SURVIVAL RATE (%) | AVERAGE SURVIVAL RATE ± STANDARD DEVIATION (%) |
|---|---|---|---|---|---|
| WITH PCI GENERATION DEVICE | 1-A | 9.96 | 10.34 ± 0.74 | 90.3 | 91.5 ± 1.31 |
| | 1-B | 9.87 | | 92.9 | |
| | 1-C | 11.19 | | 91.4 | |
| WITHOUT PCI GENERATION DEVICE | 2-D | 9.48 | 9.46 ± 0.39 | 90.7 | 92.5 ± 1.57 |
| | 2-E | 9.06 | | 93.0 | |
| | 2-F | 9.84 | | 93.7 | |

TRANSPORT CONTAINER

TECHNICAL FIELD

One aspect of the present invention relates to a container for transporting a biological component. The present application claims priority from JP 2019-169616 filed in Japan on Sep. 18, 2019, the content of which is hereby incorporated by reference into this application.

BACKGROUND ART

PTL 1 discloses a fresh fish transport container including an inner case that is made of a foamed resin and has an internal space for containing fresh fish, and an outer case that is made of cardboard and contains the inner case.

CITATION LIST

Patent Literature

PTL 1: JP 2019-64702 A (published in Apr. 25, 2019)

SUMMARY

Technical Problem

However, in the fresh fish transport container described in PTL 1, there is a problem that transportation for a long period of time is difficult due to proliferation of bacteria and the like over time.

One aspect of the present invention has been made in view of the problem described above, and an object thereof is to provide a transport container that enables transportation for a long period of time.

Solution to Problem

In order to solve the problem described above, a transport container according to one aspect of the present invention is a transport container for transporting a biological component being a cell or a collection of cells, and includes a discharge device configured to generate a discharge product inside the transport container by discharge.

Advantageous Effects of Invention

One aspect of the present invention can provide a transport container that enables transportation for a long period of time.

DESCRIPTION OF EMBODIMENTS

First Embodiment

An embodiment of the present invention will be described in detail below.

Configuration of Transport Container 1

Figure 1:
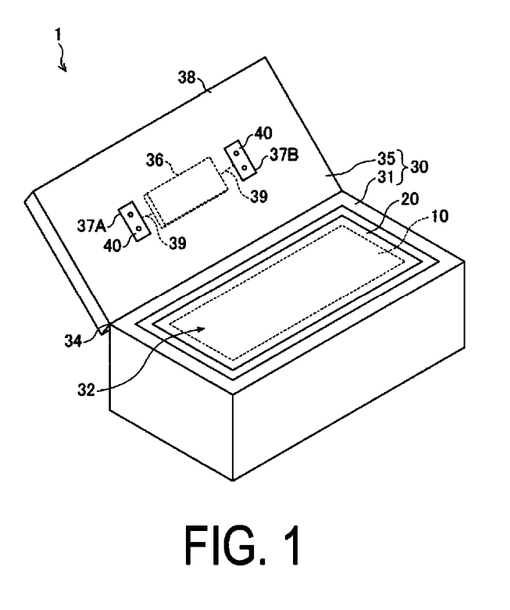
FIG. 1 is a diagram illustrating a configuration of a transport container according to a first embodiment of the present invention.

FIG. 1 is a diagram illustrating a configuration of a transport container 1 according to a first embodiment. The transport container 1 is a container for transporting a biological component being a cell or a collection of cells. In the first embodiment, the biological component is a cell, tissue, or an organ derived from a mammal. As illustrated in FIG. 1, the transport container 1 includes a primary container 10, a secondary container 20, a tertiary container 30, and an ion generation device (discharge device) 40. In this way, the transport container 1 can contain the biological component in a state of being blocked from an external environment as compared to a case where the transport container 1 does not include the primary container 10 and the secondary container 20, for example.

The primary container 10 is a cuboid container that directly contains the biological component. However, the primary container 10 is not limited to a cuboid container as long as the primary container 10 can contain the biological component, At least a part of the primary container 10 is formed of a material that transmits gas, Examples of such a material include silicone rubber and the like. In the first embodiment, an upper surface portion of the primary container 10 is formed of a material that transmits gas. The upper surface portion is a portion that faces vertically upward in a state in which the biological component is transported using the transport container 1.

The secondary container 20 is a cuboid container that contains the primary container 10. However, the secondary container 20 is not limited to a cuboid container as long as the secondary container 20 can contain the primary container 10. The secondary container 20 is not enclosed. In other words, gas such as air can enter and exit the secondary container 20.

The secondary container 20 is configured such that an inner surface is not in contact with the primary container 10. In this way, when an external impact is applied to the secondary container 20, a degree to which the impact is transferred to the primary container 10 can be reduced.

The tertiary container 30 is an enclosed cuboid container that contains the secondary container 20. However, the tertiary container 30 is not limited to a cuboid container as long as the tertiary container 30 can contain the secondary container 20. The tertiary container 30 includes a container portion 31 and a lid portion 35.

The container portion 31 is a bottomed tubular container that contains the secondary container 20. The container portion 31 has, on an upper side with a bottom portion as a lower side, an opening portion 32 for receiving the secondary container 20 and the biological component.

The lid portion 35 closes the opening portion 32. The lid portion 35 is a plate-like member having a shape capable of covering the opening portion 32. The lid portion 35 includes recessed portions 37A and 37B in an inner surface 38. With the lid portion 35 covering the opening portion 32, the tertiary container 30 is in an enclosed state. Specifically, for example, an O-ring (not illustrated) is provided in the opening portion 32, and the lid portion 35 covers the opening portion 32 with the O-ring interposed therebetween.

The lid portion 35 is connected to the container portion 31 via a hinge 34 provided along a longitudinal direction of the container portion 31. By rotating the lid portion 35 about the hinge 34, the lid portion 35 can switch between a state of covering the opening portion 32 and a state of opening the opening portion 32.

The tertiary container 30 forms a space between the secondary container 20 and the tertiary container 30, and is configured such that an inner surface is not in contact with the secondary container 20. For example, an impact absorbing material (not illustrated) and/or a heat insulating material (not illustrated) that reduces a temperature change in the secondary container 20 is disposed between the secondary container 20 and the tertiary container 30. In this way, when an external impact is applied to the tertiary container 30, a degree to which the impact is transferred to the secondary container 20 can be reduced.

The tertiary container 30 may have, on an outer surface, a handle portion for a user to transport the transport container 1. Examples of the handle portion include a grip portion for gripping with hand, a shoulder portion for hanging on a shoulder, or the like.

The ion generation device 40 is a discharge device that generates a positive ion and a negative ion (discharge product) inside the transport container 1 by discharge. However, the ion generation device 40 may be a discharge device that generates only one of the positive ion and the negative ion inside the transport container 1 by discharge. In the present embodiment, the ion generation device 40 generates the positive ion and the negative ion in the space between the tertiary container 30 and the secondary container 20. In the example illustrated in FIG. 1, the transport container 1 includes two ion generation devices 40. The number of the ion generation device 40 may be determined by a designer depending on a target ion concentration and a size of the tertiary container 30, and may be one, or three or more. Further, the transport container 1 may also include a device that generates a discharge product different from the ion, instead of the ion generation device 40. For example, instead of the ion generation device 40, the transport container 1 may include a discharge device that generates a discharge product capable of preventing, eliminating, or killing viruses, bacteria, and the like in the transport container 1 by discharge. Examples of a discharge method include plasma discharge or corona discharge, for example.

The ion generation device 40 is provided on the inside of the lid portion 35. Thus, the ion generated by the ion generation device 40 efficiently spreads into the transport container 1. However, the ion generation device 40 does not necessarily need to be provided on the inside of the lid portion 35, and may be provided on the inside of the container portion 31, for example.

Specifically, the ion generation device 40 is provided in each of the recessed portions 37A and 37B provided in the inner surface 38 of the lid portion 35. More specifically, the ion generation device 40 is provided so as not to protrude inward from the inner surface 38 of the lid portion 35. In this way, a risk of a failure due to collision of the ion generation device 40 with the secondary container 20 and the like is reduced. However, the ion generation device 40 does not necessarily need to be provided in the recessed portions 37A and 37B, and may be provided directly on the inner surface 38.

In the example illustrated in FIG. 1, a battery 36 as a power source, and a power feeder line 39 that electrically connects the battery 36 and the ion generation device 40 are embedded in the lid portion 35. However, the battery 36 may be provided on the inside of the lid portion 35. The ion generation device 40 is supplied with power from the battery 36 via the power feeder line 39.

Note that the ion generation device 40 may be supplied with power from the outside via the lid portion 35. For example, a power feeder line that connects the inside and the outside of the lid portion 35 may be provided. In this case, the battery 36 disposed outside the tertiary container 30 functions as an external power source that is connected to the ion generation device 40 via the power feeder line and supplies power. Alternatively, the ion generation device 40 may be supplied with power by electromagnetic induction from the battery 36 disposed outside the tertiary container 30. In this case, by replacing the battery 36 as necessary, generation of a discharge product can continue with the lid portion 35 in a closed state. In other words, in the transport container 1, the battery 36 can be replaced without opening the lid portion 35, and thus, entry of viruses, bacteria, and the like into the transport container 1 when the battery 36 is replaced can be prevented.

Specific Configuration of Ion Generation Device 40

Figure 2:
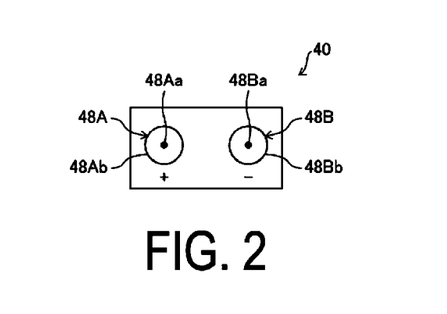
FIG. 2 is a diagram illustrating a configuration of a discharge device included in the transport container according to the first embodiment of the present invention.

FIG. 2 is a diagram illustrating a configuration of the ion generation device 40. As illustrated in FIG. 2, the ion generation device 40 has a rectangular shape in a plan view. The ion generation device 40 includes two ion generation units 48A and 48B aligned in the longitudinal direction.

The battery 36 supplies power to the ion generation units 48A and 48B. The ion is generated by each of the ion generation unit 48A and the ion generation unit 48B performing corona discharge. The ion generation unit 48A generates the positive ion, and the ion generation unit 48B generates the negative ion. However, the ion generation unit 48A may be configured to generate the negative ion, and the ion generation unit 48B may, be configured to generate the positive ion.

The ion generation units 48A and 48B respectively include discharge electrode protruding portions 48Aa and 48Ba having a sharp shape, and induction electrode rings 48Ab and 48Bb surrounding the discharge electrode protruding portions 48Aa and 48Ba. The discharge electrode protruding portions 48Aa and 48Ba are disposed on center portions of the induction electrode rings 48Ab and 48Bb, respectively.

Note that the discharge electrode protruding portions 48Aa and 48Ba may be a surface electrode, a needle electrode, a brush electrode, or the like, and a shape, a type, and a material of the discharge electrode protruding portions 48Aa and 48Ba are not limited as long as discharge can be achieved.

A positive voltage is applied to the ion generation unit 48A. When the positive voltage is applied to the ion generation unit 48A, a water molecule in the air is electrically decomposed by discharge, and a hydrogen ion $H^+$ is mainly generated. Then, the water molecule in the air aggregates around the generated hydrogen ion $H^+$, and a stable cluster ion $H^+(H_2O)_m$ having a positive charge is formed.

A negative voltage is applied to the ion generation unit 48B. When the negative voltage is applied to the ion generation unit 48B, an oxygen molecule in the air is electrically decomposed by discharge, and an oxygen ion $O_2^-$ is mainly generated. Then, the water molecule in the air aggregates around the generated oxygen ion $O_2^-$, and a stable cluster ion $O_2^-(H_2O)_n$ having a negative charge is formed.

Here, m and n are any integers. In this specification, the "positive ion" refers to a positive cluster ion, and the "negative ion" refers to a negative cluster ion. Note that generation of the positive and negative cluster ions can be confirmed by time-of-flight mass spectrometry.

The ion generation device 40 supplies the positive ion and the negative ion such that concentrations of the positive ion and the negative ion in the transport container 1 are equal to or greater than 7000/cm$^3$. When the positive/negative ion concentrations are each equal to or greater than 7000/cm$^3$, growth and proliferation of bacteria, viruses, and the like can be reduced. Further, the ion generation device 40 supplies the positive ion and the negative ion such that concentrations of the positive ion and the negative ion in the transport container 1 are equal to or less than one million/cm$^3$. When the concentrations of the positive ion and the negative ion are each equal to or less than one million/cm$^3$, disinfection can be performed without adversely affecting a cell.

When the positive ion and the negative ion are simultaneously released into the air, the positive ion and the negative ion aggregate on a surface of a microorganism and surround the microorganism. Then, the positive ion and the negative ion are momentarily bonded together, and [·OH] (hydroxyl radical) or $H_2O_2$ (hydrogen peroxide) is generated in aggregation on the surface of the microorganism. Since [OR] and $H_2O_2$ are active species having extremely high oxidizability, a chemical reaction can decompose protein on the surface of the microorganism and reduce action thereof.

Thus, in the transport container 1, the positive ion and the negative ion are generated by the ion generation device 40 and supplied into the tertiary container 30, and thus viruses present in the space between the tertiary container 30 and the secondary container 20 can be inactivated to suitably perform disinfection. Further, as described above, the secondary container 20 is not enclosed. Furthermore, the upper surface portion of the primary container 10 is formed of a material that transmits gas. Thus, in the transport container 1, the ion generated by the ion generation device 40 can also disinfect the inside of the primary container 10 and the secondary container 20.

In a known transport container, the inside is sterilized by using a drug (for example, an alcohol such as ethanol) before a biological component is contained. However, when the biological component is contained before the drug is completely vaporized, there is a problem that the remaining drug vaporized inside adversely affects the biological component (particularly, a cell). In a case where a biological component is contained after a drug is completely vaporized in order to solve this problem, viruses, bacteria, and the like enter again when the biological component is contained. Further, when a UV lamp is installed in a known transport container, there is also a problem that a biological component (particularly, a cell) is adversely affected.

In contrast, in the transport container 1, even after a biological component is contained, the ion generation device 40 can generate the ion as necessary, and the inside can be continuously disinfected.

The ion generation device 40 may further include a fan. In this way, the positive ion and the negative ion spread inside the transport container 1, and thus disinfection can be more efficiently performed.

Experiment on Effect of Ion on Biological Component

Examples of a biological component transported by the transport container 1 include an iPS cell (induced pluripotent stem cell). The inventors of the present application have conducted an experiment to confirm an effect of an ion on the iPS in the experiment, the iPS cell was cultured for seven days in an incubator with a plasma cluster ion (PCI) generation device installed and in an incubator without the PCI generation device installed, and the number of cells in a final day was counted. A concentration of the ion generated by the PCI generation device was an average of 212,000/cm$^3$.

Figure 3:
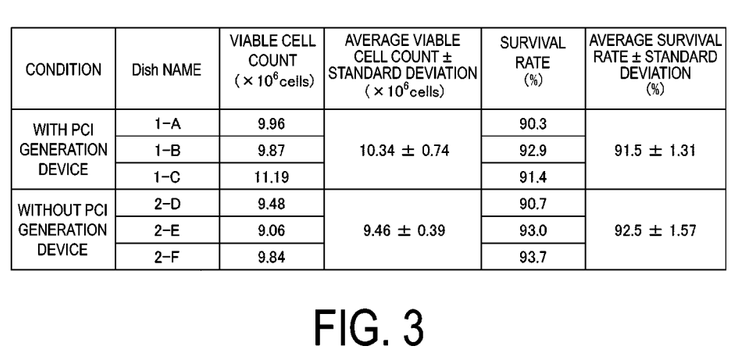
FIG. 3 is a table showing the number of cells after an experiment according to the first embodiment of the present invention.

FIG. 3 is a table showing results of the experiment. FIG. 3 shows three results for each of the presence and absence of the PCI generation device. As shown in FIG. 3, an average survival rate±standard deviation of the iPS cell in the incubator with the PCI generation device installed was 91.5±1.31%. On the other hand, an average survival rate±standard deviation of the iPS cell in the incubator without the PCI generation device installed was 92.5±1.57%. In other words, no significant difference was found in the average survival rate and the standard deviation of the iPS cell after the experiment between the presence and absence of the installation of the PCI generation device. Thus, it can be said that the transport container 1 does not adversely affect a cell even when the transport container 1 includes the ion generation device 40. Therefore, according to the transport container 1, disinfection can be performed without adversely affecting the iPS cell.

As described above, according to the transport container 1, the inside can be disinfected without affecting a biological component. Therefore, it is possible to suppress degradation of a biological component due to bacteria, and achieve transportation for a long period of time.

Second Embodiment

Another embodiment of the present invention will be described below. Note that, for convenience of description, components having the same functions as those described in the above-described embodiment will be denoted by the same reference signs, and descriptions of those components will be omitted.

Figure 4:
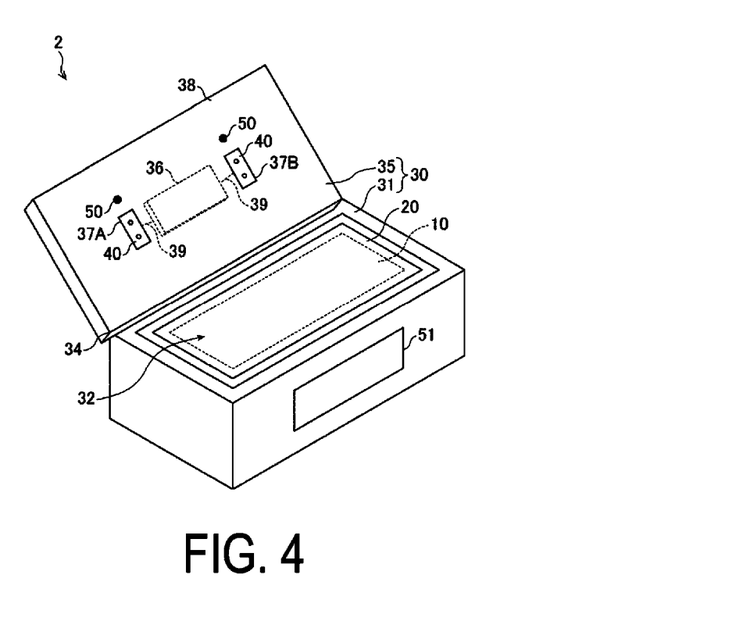
FIG. 4 is a diagram illustrating a configuration of a transport container according to a second embodiment of the present invention.

FIG. 4 is a diagram illustrating a configuration of a transport container 2 according to a second embodiment. As illustrated in FIG. 4, the transport container 2 includes an ion sensor 50 and a display unit 51 in addition to the configuration of the transport container 1.

The ion sensor 50 is a sensor that detects an ion concentration in the transport container 2, and outputs a signal corresponding to the ion concentration. The ion sensor 50 detects a concentration of one or both of a positive ion and a negative ion in the transport container 2. In the second embodiment, the ion sensor 50 is provided at two places inside a lid portion 35. However, the number of the ion sensors 50 suffices to be determined by a designer depending on detection accuracy of a target ion concentration and a size of a tertiary container 30, and may be one, or three or more. Further, the ion sensor 50 may be provided inside a container portion 31.

The display unit 51 is a display device that displays an ion concentration detected by the ion sensor 50 or information based on the ion concentration. The display unit 51 is, for example, a liquid crystal display, an organic Electro-Luminescence (EL) display. The information based on the ion concentration includes information about whether an operation of an ion generation device 40 is normal or information related to time for replacement of the ion generation device 40. When the display unit 51 displays the information based on the ion concentration, the transport container 2 suffices to include a control unit that performs processing of determining a state of the ion generation device 40 based on the ion concentration.

In the second embodiment, the display unit 51 has a rectangular shape and is provided on an outer surface of the container portion 31. However, the display unit 51 is not limited to the example described above as long as the display unit 51 is configured to be able to display an ion concentration detected by the ion sensor 50 or information based on the ion concentration. For example, the display unit 51 may have a circular shape. Further, for example, the display unit 51 may be provided on an outer surface of the lid portion 35.

According to the transport container 2, a user can recognize a state of the ion generation device 40 based on display of the display unit 51. Thus, when an abnormality occurs in operation of the ion generation device 40, and the like, action such as maintenance of the ion generation device 40 can be taken. Therefore, the transport container 2 can more reliably generate the ion, and disinfect the inside.

Third Embodiment

Still another embodiment of the present invention will be described below.

Figure 5:
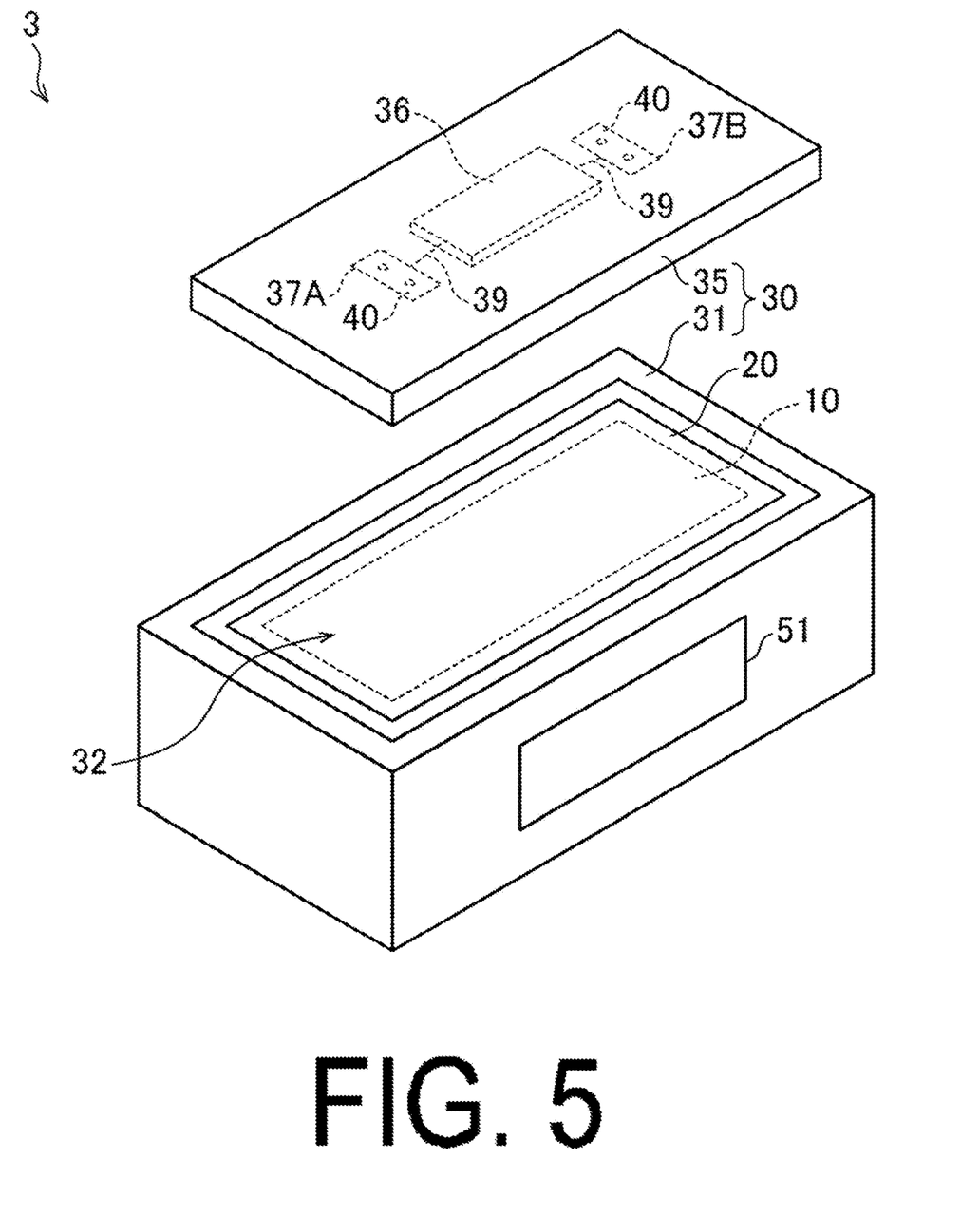
FIG. 5 is a diagram illustrating a configuration of a transport container according to a third embodiment of the present invention.

FIG. 5 is a diagram illustrating a configuration of a transport container 3 according to a third embodiment. As illustrated in FIG. 5, the transport container 3 has a configuration in which a lid portion 35 and a container portion 31 are not connected via a hinge 34. Since the transport container 3 does not include the hinge 34, the number of parts can be reduced. Thus, a manufacturing cost of the transport container 3 can be reduced as compared to that of the transport containers 1 and 2.

Fourth Embodiment

Still another embodiment of the present invention will be described below.

A biological component contained in the transport containers 1, 2, and 3 is not limited to a cell, tissue, or an organ derived from a mammal described above, and may be meat, fresh fish, vegetables, or the like. The transport containers 1, 2, and 3 can also transport meat, fresh fish, vegetables, or the like over a long period of time while maintaining freshness.

In this case, the transport containers 1, 2, and 3 do not need to include the primary container 10 and the secondary container 20 since there is a small need for excessively carefully handling the biological component. In other words, when transporting meat, fresh fish, vegetables, or the like, the transport containers 1, 2, and 3 may include the tertiary container 30 and the ion generation device 40. In such transport containers 1, 2, and 3, the number of parts can be reduced as compared to those including the primary container 10 and the secondary container 20, and thus a manufacturing cost can be reduced.

Supplement

A transport container according to an aspect 1 of the present invention is a transport container configured to transport a biological component being a cell or a collection of cells, and includes a discharge device configured to generate a discharge product inside the transport container by discharge.

According to the configuration described above, when the discharge product is generated inside the transport container by discharge, viruses present inside the transport container can be inactivated to suitably perform disinfection. Thus, the transport container that enables transportation for a long period of time can be provided.

A transport container according to an aspect 2 of the present invention in the aspect 1 may further include: a container portion including an opening portion configured to receive the biological component; and a lid portion configured to close the opening portion, wherein the discharge device may be provided on an inside of the lid portion.

According to the configuration described above, an ion generated by the discharge device efficiently spreads into the transport container.

In a transport container according to an aspect 3 of the present invention in the aspect 2, the lid portion may have a recessed portion in an inner surface, and the discharge device may be provided in the recessed portion.

According to the configuration described above, as compared to a configuration in which the discharge device is not provided in the recessed portion, a risk of a failure due to collision of the discharge device with the transport container and the like is reduced.

In a transport container according to an aspect 4 of the present invention in the aspect 2 or 3, the discharge device may be supplied with power from an external power source via the lid portion.

According to the configuration described above, the discharge device can be continuously supplied with power with the lid portion in a closed state, and a discharge product can be generated.

In a transport container according to an aspect 5 of the present invention in any of the aspects 1 to 4, the discharge device may be an ion generation device configured to generate a positive ion and a negative ion.

According to the configuration described above, the ion generation device generates the positive ion and the negative ion, and supplies the positive ion and the negative ion into the transport container, and thus viruses present inside the transport container can be inactivated to suitably perform disinfection.

In a transport container according to an aspect 6 of the present invention in the aspect 5, the discharge device may supply the positive ion and the negative ion, and set concentrations of the positive ion and the negative ion in the transport container to be equal to or greater than $7000/cm^3$.

According to the configuration described above, when the positive/negative ion concentrations are each equal to or greater than $7000/cm^3$, growth and proliferation of bacteria, viruses, and the like can be reduced.

In a transport container according to an aspect 7 of the present invention in the aspect 6, the discharge device may supply the positive ion and the negative ion, and set concentrations of the positive ion and the negative ion in the transport container to be equal to or greater than $7000/cm^3$ and equal to or less than one million/$cm^3$ According to the configuration described above, disinfection can be performed without adversely affecting a cell.

A transport container according to an aspect 8 of the present invention in any of the aspects 5 to 7 may further include: an ion sensor configured to detect a concentration of one or both of the positive ion and the negative ion in the transport container; and a display unit configured to display an ion concentration detected by the ion sensor or information based on the ion concentration.

According to the configuration described above, a user can know the ion concentration in the transport container. Further, the user can recognize the information based on the ion concentration in the transport container. For example, when an abnormality occurs in the transport container, the user can recognize an abnormality occurrence state.

A transport container according to an aspect 9 of the present invention in any of the aspects 1 to 8 may further include: a primary container configured to contain the biological component; a secondary container configured to contain the primary container; and a tertiary container configured to contain the secondary container, wherein the discharge device may generate the discharge product in a space between the tertiary container and the secondary container.

According to the configuration described above, in the transport container, the positive ion and the negative ion are generated by the discharge device and supplied into the tertiary container, and thus viruses present in the space between the tertiary container and the secondary container can be inactivated to suitably perform disinfection.

The present invention is not limited to each of the above-described embodiments. It is possible to make various modifications within the scope of the claims. An embodiment obtained by appropriately combining technical elements each disclosed in different embodiments falls also within the technical scope of the present invention. Furthermore, technical elements disclosed in the respective embodiments may be combined to provide a new technical feature.

The invention claimed is:

1. A transport container configured to transport a biological component being a cell or a collection of cells, the transport container comprising:

a discharge device configured to generate a discharge product inside the transport container by discharge;

a container portion having an opening portion that receives the biological component; and a lid portion that closes the opening portion, wherein:

the discharge device is provided inside the lid portion, the container portion includes:

a primary container configured to contain the biological component;

a secondary container configured to contain the primary container; and a tertiary container including the container portion and the lid portion, and configured to contain the secondary container, and each of the primary container and the secondary container has an upper surface portion that is a surface toward the lid portion, and the upper surface portion is formed of a material that transmits gas.

2. The transport container according to claim 1, wherein the lid portion has a recessed portion in an inner surface, and the discharge device is provided in the recessed portion.

3. The transport container according to claim 1, wherein the discharge device is supplied with power from an external power source via the lid portion.

4. The transport container according to claim 1, wherein the discharge device is an ion generation device configured to generate a positive ion and a negative ion.

5. The transport container according to claim 4, wherein the discharge device supplies the positive ion and the negative ion, and sets concentrations of the positive ion and the negative ion in the transport container to be equal to or greater than 7000/$cm^3$.

6. The transport container according to claim 5, wherein the discharge device further sets the concentrations of the positive ion and the negative ion in the transport container to be equal to or less than one million/$cm^3$.

7. The transport container according to claim 4, further comprising:

an ion sensor configured to detect a concentration of one or both of the positive ion and the negative ion in the transport container; and a display unit configured to display an ion concentration detected by the ion sensor or information based on the ion concentration.

8. The transport container according to claim 1, wherein the discharge device generates the discharge product in a space between the tertiary container and the secondary container.

* * * * *